Oct. 9, 1934.　　　　E. R. EVANS　　　1,976,063
FRICTION CLUTCH
Original Filed Aug. 24, 1925　　2 Sheets-Sheet 1
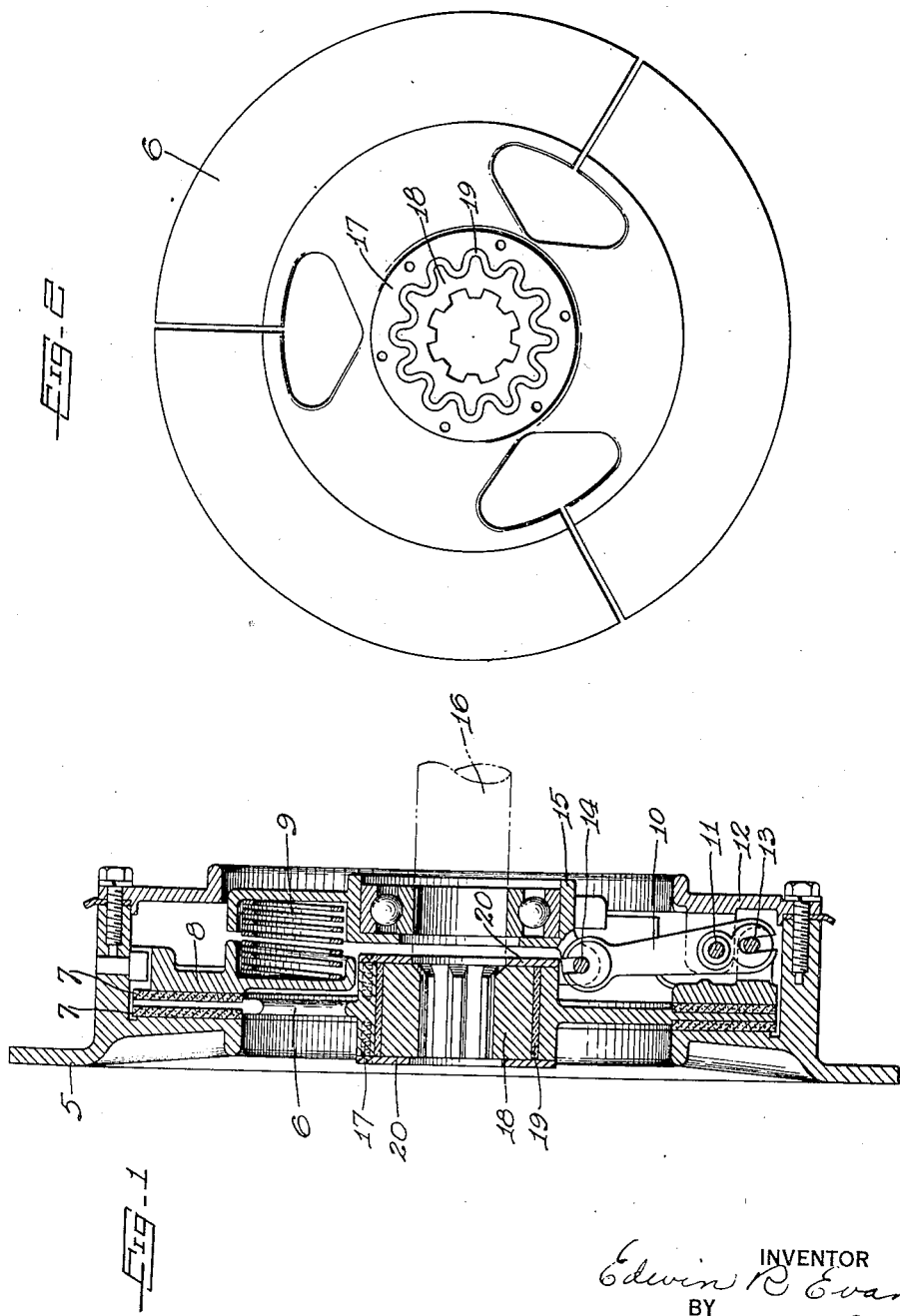
INVENTOR
Edwin R Evans
BY
Wm O Belt
ATTORNEY Oct. 9, 1934.  E. R. EVANS  1,976,063
FRICTION CLUTCH
Original Filed Aug. 24, 1925  2 Sheets-Sheet 2

INVENTOR
Edwin R. Evans
BY
Wm. O. Bell
ATTORNEY

Patented Oct. 9, 1934

1,976,063

UNITED STATES PATENT OFFICE 1,976,063

FRICTION CLUTCH

Edwin R. Evans, Chicago, Ill., assignor to The Borg & Beck Company, Chicago, Ill., a corporation of Illinois Refiled for abandoned application Serial No. 52,184, August 24, 1925. This application December 16, 1931, Serial No. 581,291

5 Claims. (Cl. 192—68)

This invention relates to friction clutches and is particularly useful in those clutches which are employed in motor vehicles.

The primary object of the invention is to eliminate those shocks and vibrations which tend to be transmitted through the clutch of a motor vehicle by providing the clutch with novel means for absorbing the shocks and vibrations.

In the accompanying drawings illustrating a selected embodiment of the invention Fig. 1 is a central sectional view of a clutch embodying the invention.

Fig. 2 is an elevation of the clutch plate with the bushing retainer removed.

Figure 4:
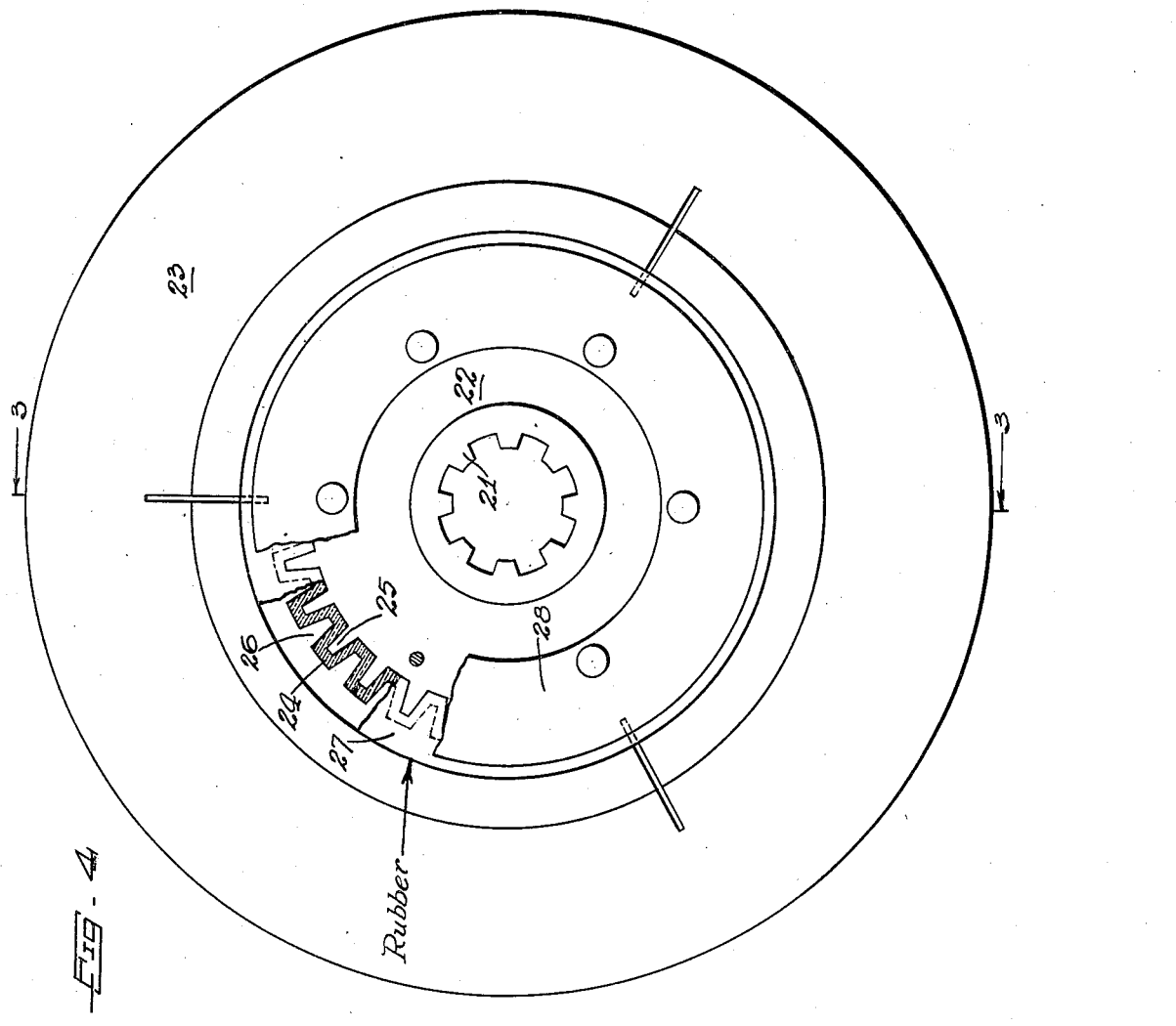
Fig. 4 is an elevation of the clutch plate shown in Fig. 3, partly broken away.

Referring to Fig. 1, 5 is the driving ring, 6 is the clutch or driven plate, 7, 7 are the facing rings and 8 is the pressure ring which is normally forced by springs 9 toward the driving ring to clamp the clutch or driven plate therebetween. Levers 10 are pivoted at 11 on the cover plate 12 and are engaged at 13 with the pressure ring and at 14 with a sleeve 15 arranged on the driven shaft 16 and operated by the operator through suitable mechanism to retract the pressure ring and release the clutch plate. My invention may be embodied in a clutch plate of any suitable construction with loose facing rings as shown in Fig. 1 or with facing rings fastened thereto.

The clutch plate 6 comprises an outer hub 17 and an inner hub 18 whose opposing faces are scalloped complementary to each other for driving engagement and spaced apart to receive a cushioning means 19 in the clearance space between the hubs. The cushioning means is preferably a solid material in the nature of rubber or other suitable resilient material and it completely fills the space between the scalloped faces of the hubs. To hold the cushion in place between the hubs I preferably provide retainer rings 20 which are fastened to the outer hub 17 by screws or other suitable means.

Figure 3:
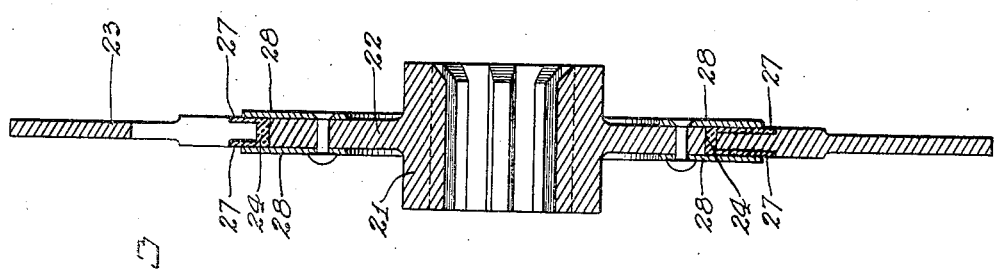
Fig. 3 is a sectional view of another form of the clutch plate.

In Figs. 3 and 4 I have shown another embodiment of the invention in which the engagement between the parts of the clutch plate is located farther from the center than in Figs. 1 and 2. The hub 21 has a flange 22 which corresponds with the inner hub 18, and the disc 23 corresponds with the outer hub 17, these parts having their opposing faces scalloped and spaced apart and the space filled with a rubber cushion 24 as before described. The scallops may be made in the form of teeth 25 on the flange 22 and 26 on the disc 23, these teeth being of the nature of gear teeth with flat surfaces instead of curved surfaces as shown in Fig. 2, but adapted to function in the same manner and for the same purpose. The rubber cushion 24 fills the space between the teeth 25 and 26 and also encloses the teeth 26 and projects outward from both sides in the form of parallel annular flanges 27 which are seated in recesses in the faces of the disc 23. Retainer rings 28 are fastened to the flange 22 and overlap the disc 23 and bear upon the rubber cushion and the flanges 27 thereon. This will prevent any noises which may otherwise be produced if the retainers contacted directly with the disc 23. The cushion of Figs. 1 and 2 may be made like the cushion of Figs. 3 and 4, and the cushion of Figs. 3 and 4 may be made like the cushion of Figs. 1 and 2 if desired. In both forms the cushion provides a resilient connection between the two parts of the clutch plate and will absorb the vibrations and shocks and jars which are ordinarily transmitted through the clutch.

I do not limit the invention to the particular forms shown in the drawings or to any particular clutch construction but I reserve the right to embody the invention in any form and in any clutch construction for which it is or may be adapted within the scope of the following claims.

This application is a substitute for a previously filed application bearing Serial No. 52,184, filed August 24, 1925.

I claim:

1. A clutch plate for friction clutches comprising an inner member and an outer member, the opposing faces of said members being scalloped and spaced apart, and rubber cushioning means in the clearance space between said members, said cushioning means enclosing the scallop projections of one member.

2. A clutch plate for friction clutches comprising an inner member and an outer member, the opposing faces of said members being scalloped and spaced apart, and rubber cushioning means in the clearance space between said members, said cushioning means enclosing the scallop projections of one member and extending radially of and on both sides of said member.

3. A clutch plate for friction clutches comprising an inner member and an outer member, the opposing faces of said members being scalloped and spaced apart, rubber cushioning means in the clearance space between said members, said cushioning means enclosing the scallop projections of the outer member and extending outwardly on both sides of said outer member, and retainer rings fastened on the inner member and overlapping the inner marginal portion of the outer member and bearing upon the extensions of said cushioning means.

4. A friction clutch comprising a flywheel, a spring pressed pressure ring, a clutch plate comprising an inner member and an outer member mounted on the inner member, said outer member being arranged between the flywheel and the pressure ring and adapted to be yieldingly clamped by the pressure ring against the flywheel to receive motion therefrom, there being a clearance between the inner and outer members of the clutch plate and the opposing surfaces of said members being scalloped, and rubber cushioning means in the clearance space between said scalloped surfaces.

5. A clutch plate for friction clutches and comprising an inner member and an outer member, the opposite faces of said members being scalloped radially and having the scallop projections on the respective members spaced apart and arranged in interfitting relation, and a continuous rubber cushion completely filling the space between the scallops and enclosing the scallop projections on one member.

EDWIN R. EVANS.